A. CORNELL.
PLOW, HARROW, AND OTHER SIMILAR AGRICULTURAL IMPLEMENT OR MACHINE.
APPLICATION FILED SEPT. 6, 1918.

1,329,582.  
Patented Feb. 3, 1920.  
2 SHEETS—SHEET 1.

Witness:  
Chas. O. Vendal

Inventor:  
Archib. Cornell

A. CORNELL.
PLOW, HARROW, AND OTHER SIMILAR AGRICULTURAL IMPLEMENT OR MACHINE.
APPLICATION FILED SEPT. 6, 1918.

1,329,582.

Patented Feb. 3, 1920.
2 SHEETS—SHEET 2.

UNITED STATES PATENT OFFICE.

ARCHER CORNELL, OF JOHANNESBURG, TRANSVAAL, SOUTH AFRICA.

PLOW, HARROW, AND OTHER SIMILAR AGRICULTURAL IMPLEMENT OR MACHINE.

1,329,582.      Specification of Letters Patent.      Patented Feb. 3, 1920.

Application filed September 6, 1918. Serial No. 252,956.

*To all whom it may concern:*

Be it known that I, ARCHER CORNELL, a subject of the King of Great Britain, and resident of Johannesburg, Transvaal Province, Union of South Africa, have invented certain new and useful Improvements Applicable to Plows, Harrows, and other Similar Agricultural Implements or Machines, of which the following is a specification.

The improvements constituting the present invention are applicable to plows, harrows, seed planters, cultivators, trenchers, and other similar agricultural implements or land working machines which it is requisite to raise or lift from the operative or working position on to wheels, in order to place the same in the inoperative position for transportation or other purposes.

Implements or machines of the kind referred to are equipped with wheels or runners which are adapted, firstly, to be raised in order to allow the plow shares, cultivator or harrow disks, et cetera, to assume their operative position in the ground, and, secondly, to be lowered in order (*a*) to place said shares, disks, et cetera, in their inoperative position above the ground, in the event of any obstruction, such as large stones, roots, et cetera, being encountered in the ground, and (*b*) to admit of the turning of the implement or machine in the head-lands or at the ends of the furrows, et cetera, and (*c*) to facilitate the transportation of the implement or machine from place to place, when they serve as the road or transport wheels.

The manipulation of the means whereby such wheels or runners are raised and lowered and the implement or machine lifted, is in some cases effected entirely by hand, and in other cases by hand with the aid of the animal draft or other tractive power.

Now the present invention appertains to an arrangement in which hand-operated means, in the one operation, releases the running or transport wheels from their elevated position and lowers them on to the ground so that the draft power then lifts the machine on to the wheels, the wheels being then automatically locked in that position; and in the other operation unlocks the wheels, thereby allowing the machine to assume the working position, the wheels being then lifted by hand into their raised position, and automatically locked in that position.

The object of the present invention is to devise a simple and effective arrangement or means whereby the said operations can be accomplished with ease and facility by the driver or operator from his seat on the implement or machine.

According to this invention I provide, nearer the rear end and at each side of the main frame of the implement or machine, and in a suitable position in relation to the operator's seat, a hanger or support. These hangers or supports revolubly carry a cranked or U-shaped member, which is placed transversely of or across the main frame. On one end of this crank or arm, and preferably at the inner side of the main frame, there is loosely mounted a lever, (hereinafter referred to as the "lifting lever"), which is placed in such a position that it can be easily reached and operated by the driver or person controlling the implement or machine, when he is in his seat. On one side of the said crank or arm, and next the aforementioned lifting lever, there is formed or fixed a sector or quadrant. At the rear of the operating lever, there is carried by the main frame a pin or spindle, on which is loosely mounted a pawl or locking piece. This pawl or locking piece operates as a spring catch or detent, and is constructed with a projection which is adapted to engage with and lock the aforementioned sector or quadrant in the two extreme positions of the latter. The one extreme position is that assumed by the sector or quadrant when the machine is lifted into its inoperative position and running on the transport wheels, and the other extreme position is that taken up by the sector or quadrant when the wheels are raised and the machine is in working position. A distance piece or collar, provided on the aforesaid pin or spindle, serves to keep the pawl or locking arm in its proper position in relation to the sector or quadrant.

To the lifting lever there is pivotally attached a further lever (hereinafter referred to as the "releasing lever"). To the lifting lever, at the outer side of the sector or quadrant, there is pivotally attached a catch which is fashioned with a tooth or projection which is adapted to engage with a projection on the outer side, and near one end, of the sector or quadrant. The tooth of the catch engages with the projection on the sector or quadrant when the lifting lever is operated to move the crank or arm in a rearward direction in order to raise the transport wheels. The pawl or locking piece, as previously explained, engages with and locks the sector or quadrant in the position in which it is placed by the lifting lever when the wheels are raised and the implement or machine lowered into working position.

The catch which at one end is pivoted to the lifting lever and engages with the projection on the side of the sector or quadrant, has pivotally attached to its other end one end of a link or connecting-rod, which latter at its other end is pivotally attached to the releasing lever. The catch, near its point of connection to the link or connecting-rod, is fashioned on the inner side with a projection which is adapted to raise the pawl or locking piece in order to disengage the latter from the sector or quadrant in either of the two extreme positions of the latter.

The running or transport wheels are rotatably carried by arms attached to the ends of a shaft, which latter, at or about the center of its length and between the rear ends of the longitudinal or side members of the main frame, is fashioned with a crank. This crank shaft is located in the frame at the rear of the crank or arm of the lifting and releasing arrangement.

The aforementioned crank shaft and crank or U-shaped members are coöperatively connected by means of a connecting-rod.

To render positive the lifting of the machine or implement on to the road or transport wheels, when the latter are lowered, means are provided which engage with the said wheels after they have been lowered, said means being such that the wheels cannot revolve without raising or lifting the frame, and placing those elements which operate in the ground in their inoperative position above ground. The aforesaid means are so designed that they automatically disengage the wheels when the machine or implement has been raised into the said position. A suitable form of such means consists, preferably for each of the road wheels, of an appropriately shaped depending arm attached to one end of a shaft journaled in bearings provided on the main frame; the said parts may be combined with a counter-balancing weight and a steadying spring, operating at opposite sides of the shaft. The wheels are provided with projections on or near the periphery for the depending arms to engage with. These arrangements are preferably so designed that the depending arms can work independently of each other.

The aforementioned depending arms may be utilized as part of a brake arrangement adapted to coöperate with the road wheels when the machine or implement is running on the latter. To this end the said levers may be fitted with brake blocks of wood or other suitable material. In order to apply the brake, means are provided for simultaneously bringing the brake blocks into frictional engagement with both wheels. This may be effected by means of a shaft mounted across the back of the main frame and having fixed thereon near one end an operating lever, the shaft at both ends being bent downward or having a crank and a projection at the end of the crank, which projections each engage a crank or arm fixed on one of the shafts carrying the depending arms. The brake operating lever is placed within easy reach of the operator or driver of the machine or implement when he is occupying his seat thereon.

As will be understood the lifting of the machine or implement on to the road or transport wheels is effected by the animal draft or other tractive power. The lowering of the wheels to engage with the depending arms of the lifting means is effected by hand, by operating the releasing lever; and the lifting of the wheels into their raised and inoperative position is also effected by hand by means of the lifting lever.

In the accompanying drawings a disk cultivator is illustrated embodying the invention in the preferred form, and the invention will be further explained with the aid of such drawings.

Figure 1:
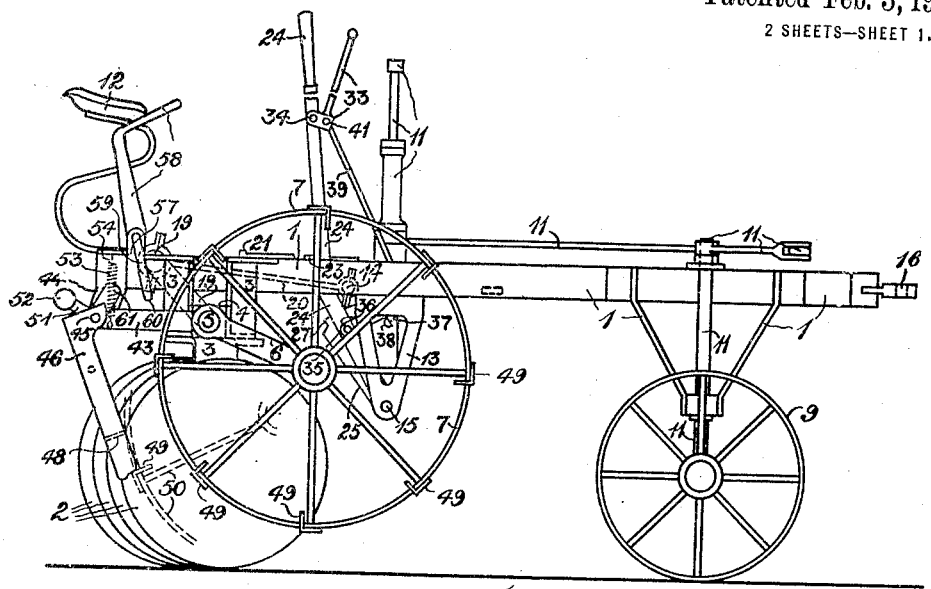
Figure 1 represents the implement or machine in side elevation.
Figure 2:
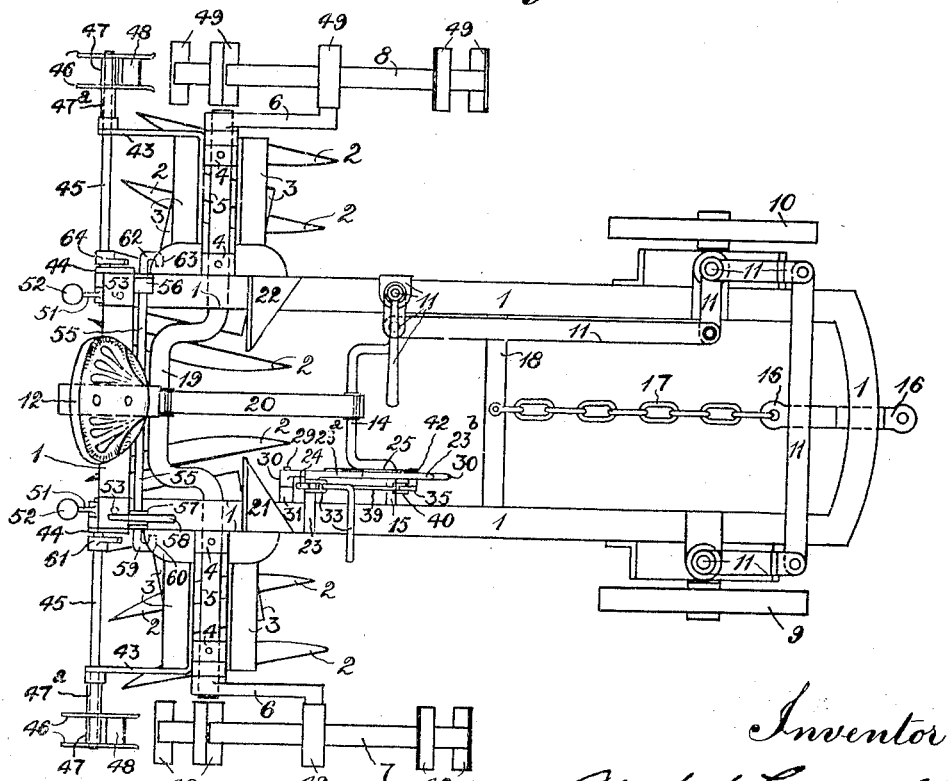
Fig. 2 represents it in plan.
Figure 3:
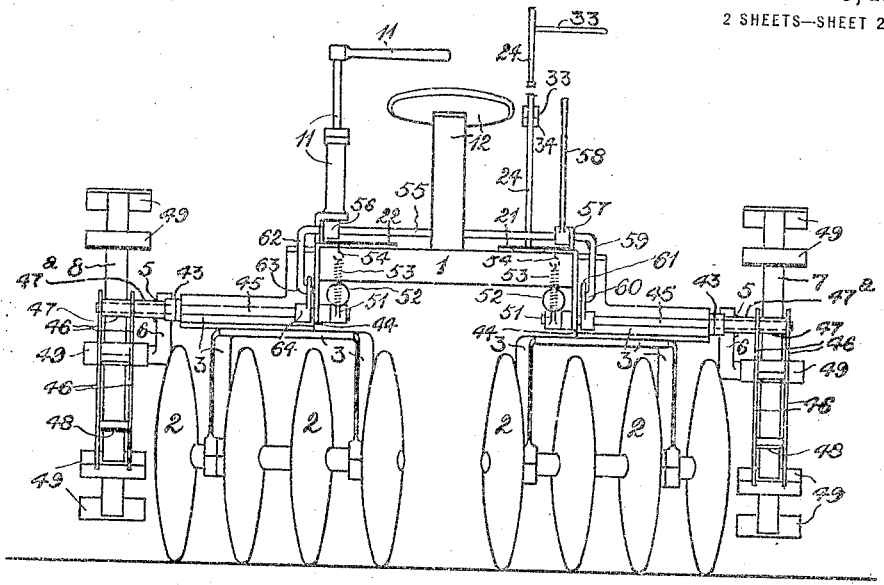
Fig. 3 is an elevation of the implement or machine as seen from the back.

In Figs. 1, 2 and 3, 1 represents the main frame of the cultivator and 2 the cultivator disks. 3 indicates the parts of the frame which carry the disks 2, and are attached to the rear portion of the main frame 1. The parts 3 of the frame support the bearings 4 for the crank shaft 5, on the ends of which are fixed the arms 6 which provide or carry the axles of the transport wheels 7, 8. 9, 10 are the front wheels, and 11 the various parts of a known arrangement for steering the machine or implement through the medium of said front wheels 9, 10. 12 is the seat for the operator secured on the rear end of the main frame 1.

These various parts may be of the construction shown, or any other suitable construction.

Figure 4:
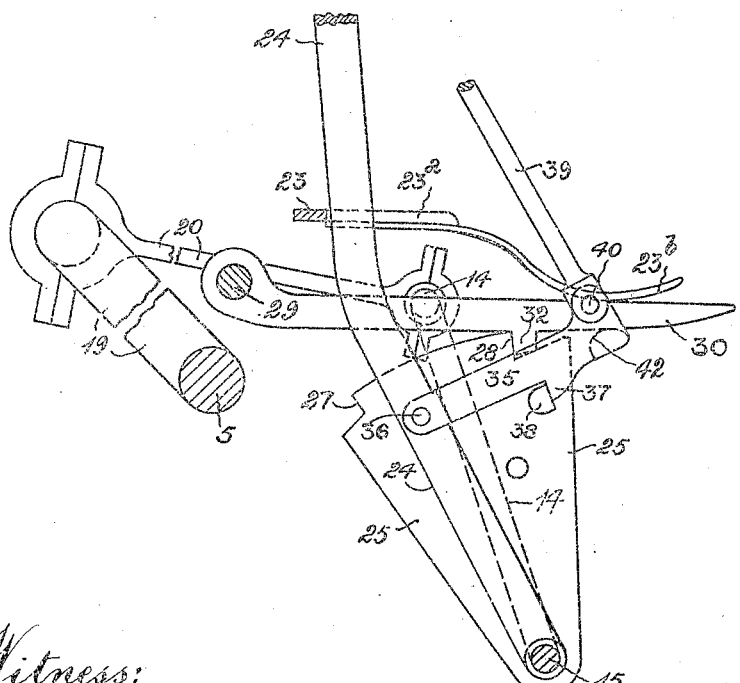
Fig. 4 is a side view of certain portions of the lifting, releasing and locking means for the transport wheels, drawn to an enlarged scale.

13 in Fig. 1 represents one of the two hangers which are fixed opposite each other to the sides, and near the rear end, of the main frame 1. 14—see Figs. 2 and 4—is the crank or U-shaped arm or member, the ends 15 of which are free to rotate in the hangers 13.

16 is the draft or draw bar, which is attached by means of the chain 17 to the cross bar 18, which latter is fixed between the side members of the main frame 1, at or about the center thereof.

19 is the crank of the shaft 5, which crank is coupled or connected with the crank or U-shaped member 14, by means of the connecting-rod 20. 21, 22 are stops fixed to the frame 1 to retain the shaft 5 in the requisite position when the transport wheels are in the lowermost position.

24 is the lifting lever, which is fulcrumed on one of the ends 15 of the crank or U-shaped arm 14. This lever is placed alongside one of the longitudinal or side members of the main frame 1—see Fig. 2—and said member is provided with a stop 23 to limit the movement of the lever 24 in a rearward direction. It is within easy reach of the driver or controller of the implement or machine when he is occupying the seat 12.

25 is the sector or quadrant—see Fig. 4—which is suitably fixed on one side of the crank or U-arm 14 facing the inner side of the lifting lever 24. The sector 25 is constructed near the top on the one side with a recess forming a projection 27 and in a corresponding position on the other side with a recess forming a projection 28.

29 is the pin or spindle which is carried by the main frame 1 at the rear of the lifting lever 24, and 30 is the pawl or locking arm loosely mounted on said pin 29 in contact with the top of the sector 25. 31 is a collar which keeps the locking arm 30 in position on the pin 29, so that said arm will engage the sector. The pawl 30—see Fig. 4—is constructed near its forward end and on the underside with a projection 32, which is adapted to engage with the projection 28 (as shown in Fig. 4) or with the projection 27, according to the position of the sector 25, and thereby lock or retain the latter in its two operative positions. The stop 23 is constructed at its inner end with a forwardly directed extension 23ª, to the underside of which is fixed a spring piece 23ᵇ, which engages with the pawl 30, and keeps it in contact with the top of the sector 25.

33 is the releasing lever, which is pivotally attached to the lifting lever at 34—see Fig. 1.

35 is the catch which is pivotally attached to the lifting lever at 36—see Fig. 4. Catch 35, which works at the outer side of the sector 25, has a tooth or projection 37 on the underside which is adapted to engage with a projection or stop 38 on the outer side, and near the front upper end of the sector 25.

39 is the link which is pivotally attached at its one and lower end to the outer forward end of the catch 35, as indicated at 40 in Fig. 4, and at its other and upper end to the releasing lever, as indicated at 41, in Fig. 1.

42 is the projection on the inner side of the front end of the catch 35, which serves for raising the pawl or locking arm 30 to disengage it from either end of the sector 25.

In the enlarged detail view of the lifting, releasing and locking means shown in Fig. 4, the projection 32 on the pawl or locking arm 30 is in engagement with the projection 28 on the sector 25. With these parts in this position the transport wheel 7, 8, are locked in the raised position (the operative position for the machine). The lifting lever 24 is now in its extreme rearward position and in engagement with the stop 23. The projection 42 on the catch 35 is seated beneath the front end of the pawl or locking arm 30, and the tooth or projection 37 of the catch 35 is in engagement with the projection or stop 38.

In order to lower the transport wheels 7, 8, to place the machine in the inoperative position the releasing lever 33 is pulled backward, which causes the projection 42 on the end of the catch 35 to lift the pawl or locking arm 30, the projection 37 thereupon releasing the sector 25 and crank arm 14. The wheels 7, 8, now come into contact with the ground, whereupon the draft or tractive power raises the implement on to the said wheels through the medium of the arm 6 and crank shaft 5, the crank 19 thereupon engaging with the stops 21, 22. With the sector 25 in this position the projection 32 on the pawl 30, is in engagement with the projection 27 on the sector 25 and the wheels thereby locked in their lowered position. To again raise the wheels 7, 8, the releasing lever 33 is drawn backward to disengage the projection 32 from the projection 27, and the lifting and releasing levers 24 and 33 are now pushed forward until the projection 32 again engages the projection 28. In this position the tooth or projection 37 of the catch 35 is in engagement with the projection or stop 38 on the outer side of the sector 25. The lifting lever 24 is now pulled backward which again brings the various parts into the position in which they are shown in Fig. 4, and the wheels are thereby locked in the raised position; the position in which they are shown in Figs. 1 to 3. This completes the cycle of operations of the lifting, releasing and locking means.

It will suffice to describe the construction and arrangement of the parts which coöperate with one of the road wheels 7, 8, to render positive the lifting of the machine or implement into the inoperative position, or onto the road or transport wheels 7, 8, when the latter are lowered on to the ground, as the parts are identical for both of said wheels. 43, 44 are two brackets, suitably fixed to the main frame for rotatably supporting the shaft 45. 46 is the depending arm fixed upon the outer end of the shaft 45. This arm is shown constructed of two similarly shaped parallel plates or pieces which are maintained apart at the requisite distance by means of one or more distance pieces, one 47 of which is represented as a tubular piece placed around the end of the shaft between the two parallel plates constituting the depending arm. 47ᵃ is a tubular distance piece on the shaft 45 between the depending arm 46 and the bracket 43, to keep the arm in position. 48 is the brake block of wood or other suitable material, which is placed between the two parallel plates in such a position that it can be brought into frictional engagement with the periphery of the wheel 8.

49 are suitably shaped pieces or parts which are fixed around the periphery of the wheel 8 and provide projections extending outwardly from both sides of the rim or felly portion of the wheel structure. These parts 49 are shown constructed of pieces of L shape in cross section, cut away or shaped to fit down the sides of the fellies or rim portion of the wheel to form the outwardly extending projections at both sides of the wheel, and at the same time provide across the tread or periphery of the wheel projecting parts or pieces which operate to prevent the wheel from skidding or slipping when it is lowered into contact with the ground.

As will be readily understood on reference to the drawings—see Fig. 2—the distance between the plates forming the arm 46 slightly exceeds the width of the felly portion of the wheel structure, so that the one plate will engage with any one of the projections provided on the wheel at the one side by the pieces 49, and the other plate with any one of the projections formed at the other side by the said pieces 49 in order to allow the wheels 7, 8, through the medium of the pieces 49 to lift the body or frame of the machine or implement the requisite height.

The manner in which the depending arm 46 engages with the lateral or side projections formed by the pieces 49 is indicated in Fig. 1, in which portion of the wheel 8 is represented in dotted lines at 50 in the position it would assume relative to the depending arm 46, when lowered. The lower end of the latter is shown engaging with the projections formed by one of the pieces 49. The lower ends of the two plates of the arm 46 are recessed or made slightly concave and rounded so that as the wheel continues to revolve they will readily readily slip off or out of engagement with the piece 49 after the machine or implement has been raised on the wheels 7, 8. After disengaging the piece 49 the arm 46 is constrained to swing in a rearward direction, and then assumes such a position that the brake block 48 can be brought into contact with the periphery of the wheel 8 without the ends of the plates of the arm 46 coming into contact with the lateral projections formed by the pieces 49 the wheel 8 having moved rearwardly sufficient to permit of this. The plates of the arm 46 will now slide over the pieces 49 and serve to guide the brake-block 48 over said pieces 49 and allow them to come into contact with the remaining portion of the wheel 8, when the brake gear, hereinafter described, is operated.

As each of the depending arms 46 cooperates with its wheel independently of the other arm and its wheel, it will be readily perceived that the lifting of the machine into the inoperative position will be commenced by that wheel whose projections 49 first engage its depending arm, the other engaging during the operation of lifting and assisting therein.

51 is a lever fixed on the other and inner end of the shaft 45 and 52 a counterbalance weight, provided on one end of said lever 51 for maintaining the depending arm 46 in its proper forwardly inclined position to engage with the lateral projections formed by the pieces 49. The other and inwardly projecting arm of lever 51 has attached to it one end of a steadying spring 53, the other end of which is fixed to the main frame, as indicated at 54. The provision of the spring 53 insures and maintains proper engagement of the projections 49 with the depending arm 46 by absorbing the concussion and preventing the latter from glancing or being deflected off the former when they first engage each other, while at the same time permitting of the due disengagement of the same after the machine has been lifted on to the road wheels.

55 is the shaft of the brake arrangement mounted across the back of the main frame 1, and 56, 57 bearings in which said shaft 55 is journaled. 58 is the brake operating lever fixed upon and near one end of the shaft 55 and having at its upper end a handle in a position readily accessible to the driver or operator of the machine when he is in occupation of the seat 12. 59 is the downwardly bent portion or crank of the end of the shaft 55, and 60 is the inwardly directed projection at the end of the crank 59, which projection engages with a crank or arm 61 on the shaft 55, when the lever 58 is operated to apply the brake. 62 is the downwardly bent portion or crank of the other end of the shaft 55, and 63 the inwardly directed projection at the end of said crank 62. The projection 63 engages with a crank or arm 64 (similar to the crank or arm 61) which is fixed on the other shaft 45, when the lever 58 is operated to apply the brake.

As will be understood from the preceding description the brake arrangement is employed for controlling or arresting the movement of the machine or implement when it is traveling on the road or transport wheels 7, 8. This is effected by moving the lever 58 in a forward direction. This movement causes the projections 60, 63 to move the cranks or arms 61, 64, rearwardly, which, by rotating the shafts 45, brings the brake blocks 48 of the depending arms 46 into contact with the peripheries of the wheels 7, 8.

What I claim as my invention, and desire to protect by Letters Patent is:—

1. In agricultural implements or land-working machines, in combination a frame, a cranked member upon which said frame is mounted, wheels mounted upon said cranked member and carrying the frame, a combined cranked member and quadrant, means connecting said combined cranked member and quadrant and the first-mentioned cranked member, a lifting or lowering lever coöperating with the combined cranked member and quadrant to raise or lower the wheels, a releasing lever coöperating with said lifting lever and the quadrant, a catch operated by said releasing lever and coöperating with the quadrant which serves to automatically lock the combined cranked member and quadrant in predetermined positions, projecting pieces on the wheels and members attached to the frame and adapted to engage said projecting pieces when the wheels are rotated in order to lift the frame on the wheels.

2. In agricultural implements or land-working machines, in combination a frame, a cranked member upon which said frame is mounted, wheels mounted upon said cranked member and carrying the frame, a combined cranked member and quadrant, means connecting said combined cranked member and quadrant and the first-mentioned cranked member, a lifting or lowering lever coöperating with the combined cranked member and quadrant to raise or lower the wheels, a releasing lever coöperating with said lifting lever and the quadrant, a catch operated by said releasing lever and coöperating with the quadrant which serves to automatically lock the combined cranked member and quadrant in predetermined positions, projecting pieces on the wheels and members attached to the frame and adapted to engage said projecting pieces when the wheels are rotated in order to lift the frame on the wheels, and spring and counterweight means which serve to keep said last mentioned members in engagement with the wheels.

In testimony whereof I have signed my name to this specification in the presence of two subscribing witnesses.

ARCHER CORNELL.

Witnesses:
CHAS. OVENDALE,
J. PLEIN.